(12) United States Patent
Rolff et al.

(10) Patent No.: US 11,320,337 B2
(45) Date of Patent: May 3, 2022

(54) METHOD FOR LEAK TESTING WITH A FOIL CHAMBER WITH VENTED MEASUREMENT VOLUME

(71) Applicant: INFICON GmbH, Cologne (DE)

(72) Inventors: Norbert Rolff, Kerpen-Horrem (DE); Silvio Decker, Cologne (DE)

(73) Assignee: INFICON GmbH, Cologne (DE)

( * ) Notice: Subject to any disclaimer, the term of this patent is extended or adjusted under 35 U.S.C. 154(b) by 0 days.

(21) Appl. No.: 16/770,333

(22) PCT Filed: Dec. 6, 2018

(86) PCT No.: PCT/EP2018/083849
§ 371 (c)(1),
(2) Date: Jun. 5, 2020

(87) PCT Pub. No.: WO2019/110749
PCT Pub. Date: Jun. 13, 2019

(65) Prior Publication Data
US 2020/0378862 A1    Dec. 3, 2020

(30) Foreign Application Priority Data

Dec. 8, 2017  (DE) ..................... 10 2017 222 308.1

(51) Int. Cl.
*G01M 3/32*  (2006.01)
*G01M 3/36*  (2006.01)

(52) U.S. Cl.
CPC ................ *G01M 3/32* (2013.01); *G01M 3/36* (2013.01)

(58) Field of Classification Search
CPC .......... G01M 3/32; G01M 3/36; G01M 3/3281
See application file for complete search history.

(56) References Cited

U.S. PATENT DOCUMENTS

| 3,813,923 A | 6/1974 | Pendleton |
| 6,513,366 B1 | 2/2003 | Stauffer |
| 2013/0186180 A1* | 7/2013 | Downing ................ G01M 3/20 73/40.7 |

(Continued)

FOREIGN PATENT DOCUMENTS

| DE | 69623171 T2 | 4/2003 |
| DE | 102012200063 A1 | 7/2013 |

(Continued)

*Primary Examiner* — David Z Huang
(74) *Attorney, Agent, or Firm* — The Webb Law Firm

(57) ABSTRACT

Method for testing a test piece for the presence of a leak using a foil chamber, wherein the foil chamber has walls having at least one flexible wall region to which a measurement volume adjoins and is arranged on that side of the flexible wall region opposite the foil chamber volume and is hermetically separated from the foil chamber volume, having the following steps: placing the test piece in the foil chamber, closing the foil chamber, evacuating the foil chamber and monitoring the measurement volume during evacuation of the foil chamber, using the result of the monitoring to reach a conclusion regarding the magnitude of a leak, characterized in that a venting valve connecting the measurement volume to the atmosphere is closed when the pressure in the measurement volume is below a predefined threshold value, and is opened as soon as the pressure exceeds the threshold value.

3 Claims, 2 Drawing Sheets

(56) References Cited

U.S. PATENT DOCUMENTS

| | | | |
|---|---|---|---|
| 2014/0326051 A1 | 11/2014 | Wetzig et al. | |
| 2015/0241298 A1 | 8/2015 | Decker | |
| 2017/0097275 A1 | 4/2017 | van Triest et al. | |
| 2017/0254720 A1* | 9/2017 | Decker | G01M 3/26 |
| 2017/0254721 A1* | 9/2017 | Casari | G01M 3/3263 |

FOREIGN PATENT DOCUMENTS

| | | |
|---|---|---|
| DE | 102012217945 A1 | 4/2014 |
| DE | 102014218399 A1 | 3/2016 |
| WO | 2015140042 A1 | 9/2015 |

* cited by examiner

METHOD FOR LEAK TESTING WITH A FOIL CHAMBER WITH VENTED MEASUREMENT VOLUME

CROSS-REFERENCE TO RELATED APPLICATIONS

This application is the United States national phase of International Application No. PCT/EP2018/083849 filed Dec. 6, 2018, and claims priority to German Patent Application No. 10 2017 222 308.1 filed Dec. 8, 2017, the disclosures of which are hereby incorporated by reference in their entirety.

BACKGROUND OF THE INVENTION

Field of the Invention

The invention relates to a method for testing a test specimen for the presence of a leak using a foil chamber.

Description of Related Art

The foil chamber is a test chamber with at least one flexible wall portion which is made e.g. of a foil. A typical foil chamber has two foil layers placed against each other around the test specimen so as to completely enclose the test specimen. After having received the test specimen, the foil chamber is hermetically closed and evacuated. Then, the pressure change in the portion of the foil chamber volume outside the test specimen is monitored, with a pressure increase being considered as an indication of a leak in the test specimen. As an alternative to monitoring the pressure in the foil chamber volume, it is also possible to monitor the flexible wall portion, wherein a variation of the flexible wall portion or the foil may indicate a leak. Such a method is known from DE 10 2012 200 063 A1.

DE 10 2014 218 399 A1 describes a foil chamber for gross leak testing of a test specimen, which chamber has a measurement volume adjoining the flexible wall portion on the opposite side of the flexible wall portion in the foil chamber volume. The measurement volume is formed hermetically separated from the foil chamber volume. In one embodiment in which the foil chamber comprises two flexible wall portions each in the form of one foil, a measurement volume adjoins each of the two foils, respectively. In the method described, the closed foil chamber holding the test specimen is evacuated, with the measurement volume being monitored already during evacuation of the foil chamber so as to assess the size of a possible leak in the test specimen based on the monitoring result. Monitoring the measurement volume can be effected by measuring the pressure in the measurement volume or by measuring the gas flow in the foil chamber or from the foil chamber.

When a test specimen having a gross leak is examined in this manner, the test specimen is at least partly evacuated as well while the foil chamber is evacuated. Due to the flexible wall portion between the foil chamber volume and the measurement volume, the measurement volume is then enlarged. Here, the enlargement of the measurement volume is greater that in the case of a tight test specimen or in the case of a test specimen having a smaller leak. In the case of a tight test specimen only the foil chamber volume in the region outside the test specimen is evacuated. In the case of a test specimen with a gross leak, the test specimen or at least a part of the test specimen volume is also evacuated in addition, so that a greater volume is evacuated than in the case of a tight test specimen. Thereby, the volume expansion of the measurement volume is the greater, the bigger the leak in a test specimen is. Based on the expansion of the measurement volume and/or the flexible wall portion, it is then possible to assess the size of a possible leak in the test specimen.

It is an object of the present invention to allow for gross leak detection on a test specimen, which detection is improved in particular for large test specimens.

SUMMARY OF THE INVENTION

The method of the invention is defined by the features of claim 1.

According thereto, a controllable vent valve is provided in a gas path connecting the measurement volume with the atmosphere surrounding the foil chamber, the valve being closed when the foil chamber is closed, if the pressure within the measurement volume is below a threshold value. As soon as the pressure in the measurement volume exceeds the threshold value when the foil chamber is closed, the vent valve is opened. With a small test specimen, the threshold value of the pressure in the measurement volume is not exceeded upon closure of the foil chamber and the vent valve remains closed. With a large test specimen that displaces a correspondingly greater proportion of the measurement volume upon closure of the foil chamber, the predetermined threshold value of the pressure in the measurement volume is exceeded and the valve is opened so that excessive gas can escape from the measurement volume and, as a consequence, the flexible wall portion or the foil lays around the test specimen.

During measurement, e.g. during the monitoring of the measurement volume upon evacuation of the foil chamber, the vent valve remains closed. The vent valve also remains closed when the test specimen is removed and a new test specimen is placed in the foil chamber for a subsequent measurement. Here, the measurement volume does not have to be reduced again and the measurement is performed faster than before. In the case of a smaller test specimen used in a subsequent measurement, the flexible wall portion or the foil is drawn onto the outer contour of the test specimen during the evacuation of the foil chamber, so that the gas necessary for expanding the flexible measurement volume or the foil can flow in.

BRIEF DESCRIPTION OF THE DRAWINGS

Hereinafter an embodiment of the invention will be explained in detail with reference to the drawings. In the Figures.

DESCRIPTION OF THE INVENTION

Figure 1:
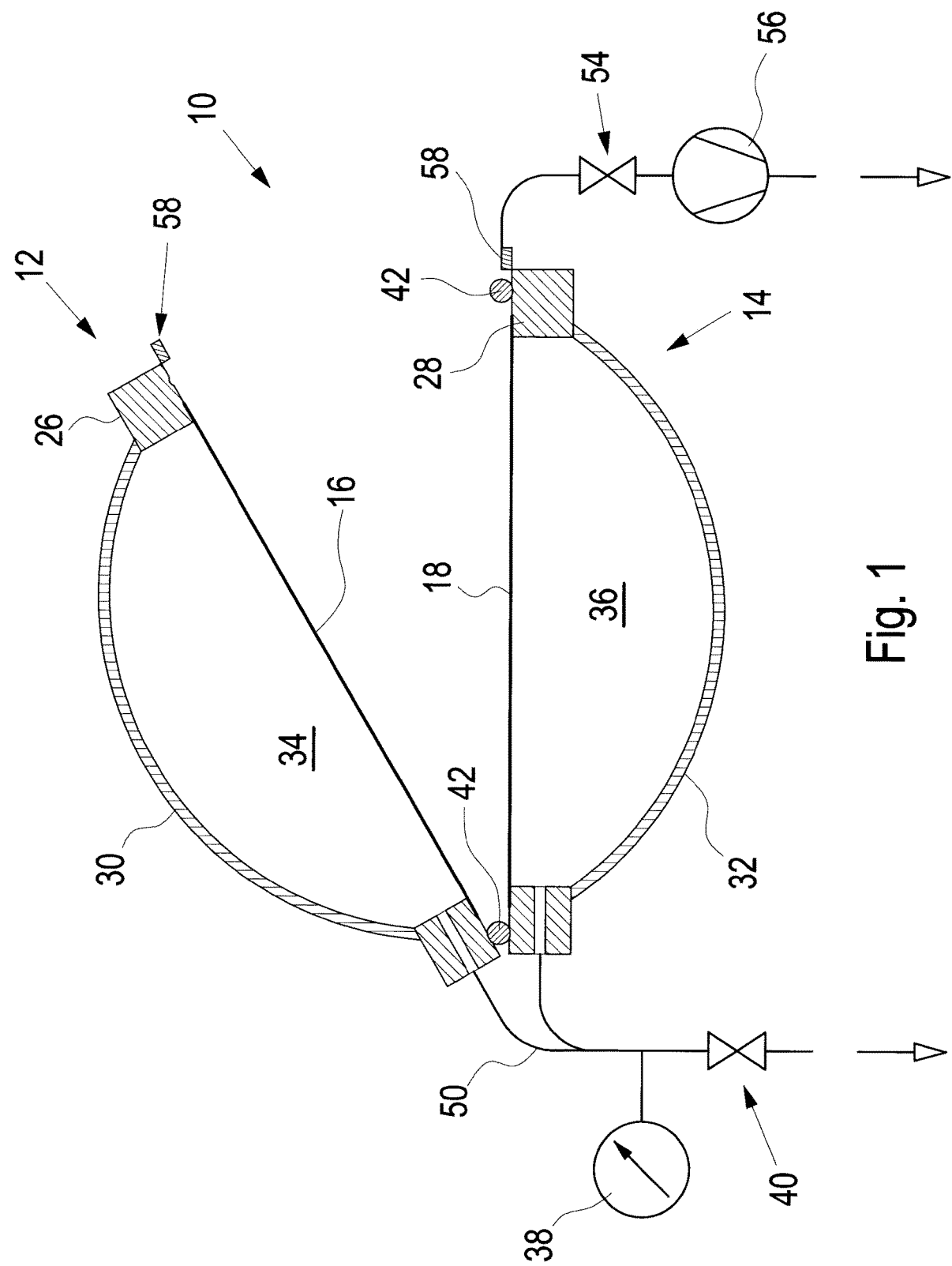
FIG. 1 shows the foil chamber in the open state.
Figure 2:
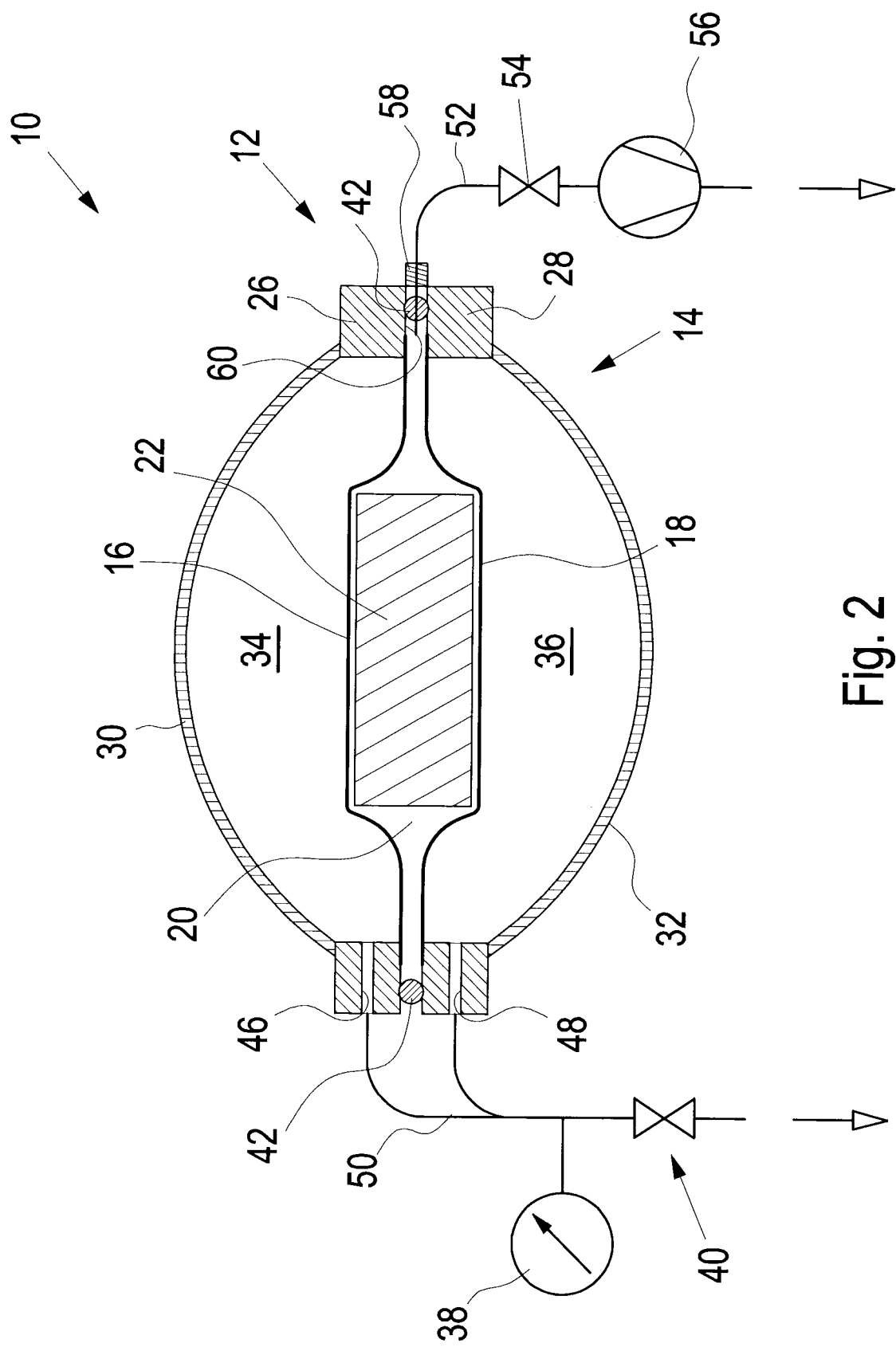
FIG. 2 shows the foil chamber in the closed state with the test specimen placed therein.

The foil chamber 10 illustrated in FIGS. 1-2 comprises an upper cover 12 and a lower cover 14. The upper foil layer 16 is an essential element of the upper cover 12, and the lower foil layer 18 is an essential element of the lower cover 14. In the closed state of the foil chamber (see FIG. 2), the two foil layers 16, 18 enclose the test specimen 22 contained in the foil chamber volume 20.

On the side facing the foil chamber volume 20, each of the two foil layers 16, 18 has a non-woven, not illustrated in the Figures, as a gas-conducting layer. Together with the not illustrated non-woven, each foil layer 16, 18 forms the respective flexible wall portion of the foil chamber 10.

In the region of their outer edge, the foils 16, 18 are each connected with a measuring chamber ring 26, 28 in a gas-tight manner. The foil layer 16 thus hermetically closes the lower end of the upper measuring chamber ring 26 facing to the foil chamber. Analogously, the lower foil layer 18 closes the upper end of the lower measuring chamber ring 28 facing to the foil chamber volume 20. The end of each measuring chamber ring 26, 28 respectively opposite the corresponding foil layer 16, 18 is hermetically closed by means of a measuring chamber cover 30, 32.

The measuring chamber cover 30, the measuring chamber ring 26 and the foil layer 16 thus enclose an upper measurement volume 34, and the foil layer 18, the measuring chamber ring 28 and the measuring chamber cover 32 enclose a lower measurement volume 36. The measurement volumes 34, 36 are hermetically separated from the foil chamber volume 20 and the outer atmosphere surrounding the foil chamber 10. A gas conduction path 50 illustrated in the Figures, e.g. a tube or a connecting line, connects measurement volumes 34, 36 with each other in a gas-conducting manner so as to effect a constant pressure compensation between the measurement volumes 34, 36.

Each measurement volume 34, 36 is connected to a gas conduction path 50 via a gas-conducting channel 46, 48 in the respective measuring chamber ring 26, 28. The gas conduction path 50 includes a pressure measurement device 38 which allows the pressure in the two measurement volumes 34, 36 of the measuring chambers to be measured. Moreover, the gas conduction path 50 comprises a controllable vent valve 40 that connects the gas conduction line 50 and the measurement volumes 34, 36 to the atmosphere surrounding the foil chamber 10 on the outside. In the closed state of the vent valve 40, the measurement volumes 34, 36 are hermetically separated from the atmosphere, and in the open state of the vent valve 40, they are connected with the atmosphere in a gas-conducting manner.

A sealing ring 42 is provided between the two foil layers 16, 18 in the region of the outer edge, the sealing ring providing a gastight connection between the foil layers 16, 18 in the closed state of the foil chamber 10.

An evacuation line 52 comprising a valve 54 connects the foil chamber 10 with a vacuum pump 56 which evacuates the foil chamber volume towards the outer atmosphere. Via a vacuum connection 58, the vacuum line 52 is connected with a vacuum channel 60 formed between the two measuring chamber rings 26, 28.

FIG. 1 illustrates the foil chamber 10 in the open state. Access to the foil chamber volume 20 is free for placing the test specimen 22 in the foil chamber volume 20. Thereafter, the foil chamber 10 is closed and the foil chamber volume 20 is evacuated using the vacuum pump 56 so that the foils 16, 18 lay themselves closely around the test specimen 22.

Prior to venting the foil chamber 10 with the test specimen 22 placed therein in advance, the vent valve 40 is closed so that the measuring chamber volumes 34, 36 are hermetically separated from the atmosphere, when the pressure in the measuring chamber volumes 34, 36 as measured with the measurement device 38 does not exceed a predetermined threshold value. This threshold value is selected such that in the case of a comparatively small test specimen, the foils 16, 18 are pressed against the specimen and fit themselves snugly around the outer contour of the test specimen. In the case of a comparatively large test specimen, the pressure in the measurement volumes 34, 36 as measured with the measurement device 38 increases and exceeds the threshold value, whereby the vent valve 40 opens automatically. To this end, the pressure measurement device 38 and the vent valve 40 are connected with an electronic control device not illustrated for the sake of clarity, which control device senses the pressure measured by the measurement device 38 and compares the same to the threshold value and opens vent valve 40 automatically when the threshold value is exceeded and closes the vent valve 40 again when the threshold is undershot.

Conventionally, the vent valve 40 was closed for pressure measurement in the measuring chambers and was opened in the case of large test specimens. In the breaks between the measurements the foils 16, 18 returns into the pressure-less state, with air flowing into the measuring chamber volumes 34, 36. Conventionally, if a large test specimen is now placed therein, the air had to be expelled through the tubes of the gas conduction path 50 and the vent valve 40, resulting in a delay and meaning more effort for the user.

According to the invention the vent valve 40 is closed and opened only when the pressure in the measurement volumes 34, 36 becomes too high, e.g. exceeds a predetermined threshold value. When a large test specimen 22 is placed in the foil chamber 10, the pressure rises as the foil chamber 10 is closed, until the threshold value is exceeded and the vent valve 40 is opened automatically. Thereafter, excessive air can flow out from the measuring chambers or the measuring chamber volumes 36, 38 as before, until the foil chamber 10 can be closed completely. The vent valve 40 will then remain closed during measurement and during the subsequent removal of the test specimen 22. When placing a next test specimen, it is no longer necessary to expel the air from the measurement volumes 34, 36, since the air has already been expelled and no new air has flown into the measurement volumes 34, 36 due to the closed vent valve 40. Thus, only when placing the first test specimen for a series of subsequent measurements on different test specimens, is it necessary to adjust the amount of gas in the measurement volumes 34, 36 in the conventional manner.

The invention offers the advantage that in subsequent measurements on different test specimens, it is not necessary to actively expel excessive air from the measuring chamber volumes each time a new successive test specimen is placed therein. Since the foils 16, 18 lay themselves around the test specimen 22 when the foil chamber 10 is closed, evacuating the foil chamber volume 20 is also effected faster than with the conventional method. Thus, the invention offers the decisive advantage that subsequent measurements on different test specimens are performed faster than before.

The invention claimed is:

1. A method for testing a test specimen for the presence of a leak using a foil chamber to receive the test specimen, wherein the foil chamber comprises walls enclosing a foil chamber volume, wherein the walls comprise at least one flexible wall portion adjoining a measurement volume which is arranged on a side of the flexible wall portion opposite the foil chamber volume and is hermetically separated from the foil chamber volume, the method comprising the steps of:
   introducing the test specimen into the foil chamber,
   closing the foil chamber,
   evacuating the foil chamber,
   monitoring the measurement volume during closing and evacuating of the foil chamber, and
   venting and opening the foil chamber, in order to remove the test specimen and introduce a new test specimen into the foil chamber,
   wherein a vent valve connecting the measurement volume to surrounding atmosphere is closed prior to and during closing of the foil chamber when a pressure in the measurement volume is below a predetermined threshold value, and is opened for venting the measurement volume as soon as the pressure in the measurement volume exceeds the threshold value during closing of the foil chamber so that excessive gas escapes from the measurement volume and the flexible wall portion lays around the test specimen, and the vent valve is closed before the foil chamber is vented and opened.

2. The method of claim 1, wherein the vent valve remains closed after the monitoring of the measurement volume and during introducing the new test specimen into the foil chamber for a subsequent leak test.

3. The method of claim 1, wherein the test specimen is removed from the foil chamber after the leak test and the new test specimen is placed in the foil chamber for a subsequent leak test, wherein the vent valve is closed prior to the removal of the test specimen and remains closed during the introducing the new test specimen into the foil chamber and is opened as soon as the pressure in the measurement volume exceeds the threshold value upon closing the foil chamber.

* * * * *